US 9,877,349 B2

(12) United States Patent
Kim et al.

(10) Patent No.: US 9,877,349 B2
(45) Date of Patent: Jan. 23, 2018

(54) METHOD FOR PERFORMING PROXIMITY SERVICE, AND USER DEVICE

(71) Applicant: LG ELECTRONICS INC., Seoul (KR)

(72) Inventors: Laeyoung Kim, Seoul (KR); Jinsook Ryu, Seoul (KR); Hyunsook Kim, Seoul (KR); Jaehyun Kim, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 15/118,528

(22) PCT Filed: Feb. 12, 2015

(86) PCT No.: PCT/KR2015/001404
§ 371 (c)(1),
(2) Date: Aug. 12, 2016

(87) PCT Pub. No.: WO2015/137631
PCT Pub. Date: Sep. 17, 2015

(65) Prior Publication Data
US 2017/0079081 A1 Mar. 16, 2017

Related U.S. Application Data

(60) Provisional application No. 62/104,823, filed on Jan. 18, 2015, provisional application No. 61/951,475, (Continued)

(51) Int. Cl.
*H04W 4/00* (2009.01)
*H04W 76/02* (2009.01)
(Continued)

(52) U.S. Cl.
CPC ......... *H04W 76/023* (2013.01); *H04W 4/008* (2013.01); *H04W 76/043* (2013.01); *H04W 84/042* (2013.01)

(58) Field of Classification Search
CPC ... H04W 76/023; H04W 4/008; H04W 72/14; H04W 84/042
(Continued)

(56) References Cited

U.S. PATENT DOCUMENTS 9,369,961 B2 * 6/2016 Berggren .......... H04W 52/0229
9,385,862 B2 * 7/2016 Escott ................... H04L 63/061
(Continued)

FOREIGN PATENT DOCUMENTS

WO   2012-157941 A2   11/2012
WO   2013-032259 A2   3/2013

OTHER PUBLICATIONS

"3rd Generation Partnership Project; Technical Specification Group Services and System Aspects; Feasibility study for Proximity Services (ProSe) (Release 12)", 3GPP TR 22.803 V12.2.0, Jun. 28, 2013 (http://www.3gpp.org/ftp/specs/archive/22_series/22.803/) See p. 18.

*Primary Examiner* — Cong Tran
(74) *Attorney, Agent, or Firm* — Dentons US LLP

(57) ABSTRACT

One embodiment of the present specification provides a method comprising the steps of: transferring, by an access stratum (AS) layer of a user device, information on a communication state with another user device to an upper layer through a non-access stratum (NAS) layer, while the user device communicates with the other user device through a direct communication path; receiving, by the NAS layer, a notification on a change of the communication path from the upper layer; commanding, by the NAS layer, the AS layer to perform a radio resource control (RRC) connection procedure in a request type (call type) which indicates the purpose of service continuity in accordance with the change of the communication path; and transmitting, by the AS layer, an RRC connection request message including (Continued)

a connection request type (establishment cause) which indicates the purpose of the service continuity of the proximity service to a base station.

10 Claims, 14 Drawing Sheets

Related U.S. Application Data filed on Mar. 11, 2014, provisional application No. 61/950,220, filed on Mar. 10, 2014.

(51) Int. Cl.
*H04W 76/04* (2009.01)
*H04W 84/04* (2009.01)

(58) Field of Classification Search
USPC ......... 455/419, 422.1, 425, 426.1, 428, 403, 455/404.1
See application file for complete search history.

(56) References Cited

U.S. PATENT DOCUMENTS

| | | | |
|---|---|---|---|
| 2010/0279672 A1 | 11/2010 | Koskela et al. | |
| 2010/0297979 A1* | 11/2010 | Watfa | H04W 8/205 455/404.1 |
| 2013/0288668 A1* | 10/2013 | Pragada | H04W 12/06 455/426.1 |
| 2013/0324114 A1 | 12/2013 | Raghothaman et al. | |
| 2014/0031028 A1* | 1/2014 | Yamada | H04W 76/023 455/419 |
| 2014/0126460 A1* | 5/2014 | Bienas | H04W 74/002 370/315 |
| 2014/0133304 A1* | 5/2014 | Pica | H04W 48/20 370/232 |
| 2015/0289200 A1* | 10/2015 | Nylander | H04W 48/06 370/331 |
| 2015/0373607 A1* | 12/2015 | Zhu | H04W 36/22 370/331 |
| 2016/0242065 A1* | 8/2016 | Fukuta | H04W 72/04 |

\* cited by examiner

METHOD FOR PERFORMING PROXIMITY SERVICE, AND USER DEVICE

This application is a National Stage Entry of International Application No. PCT/KR2015/001404 filed Feb. 12, 2015, which claims priority to U.S. Provisional Application Nos. 62/104,823 filed Jan. 18, 2015, 61/951,475 filed Mar. 11, 2014, and 61/950,220 filed Mar. 10, 2014, all of which are incorporated by reference for all purposes as if fully set forth herein.

BACKGROUND OF THE INVENTION

Field of the Invention

The present invention relates to proximity communication.

Related Art

In 3GPP in which technical standards for mobile communication systems are established, in order to handle 4th generation communication and several related forums and new technologies, research on Long Term Evolution/System Architecture Evolution (LTE/SAE) technology has started as part of efforts to optimize and improve the performance of 3GPP technologies from the end of the year 2004.

SAE that has been performed based on 3GPP SA WG2 is research regarding network technology that aims to determine the structure of a network and to support mobility between heterogeneous networks in line with an LTE task of a 3GPP TSG RAN and is one of recent important standardization issues of 3GPP. SAE is a task for developing a 3GPP system into a system that supports various radio access technologies based on an IP, and the task has been carried out for the purpose of an optimized packet-based system which minimizes transmission delay with a more improved data transmission capability.

An Evolved Packet System (EPS) higher level reference model defined in 3GPP SA WG2 includes a non-roaming case and roaming cases having various scenarios, and for details therefor, reference can be made to 3GPP standard documents TS 23.401 and TS 23.402. A network configuration of FIG. 1 has been briefly reconfigured from the EPS higher level reference model.

FIG. 1 shows the configuration of an evolved mobile communication network.

As illustrated, an evolved UMTS terrestrial radio access network (E-UTRAN) is connected to an evolved packet core (EPC). The E-UTRAN is a radio access network defined after 3GPP release-8, and is also called a 4th generation (4G) (i.e., LTE) network. A radio access network before the LTE, i.e., a 3rd generation (3G) radio access network, is a UTRAN.

The E-UTRAN includes a base station (BS) (or eNodeB) 20 which provides a control plane and a user plane to a user equipment (UE). The BSs (or eNodeBs) 20 may be interconnected by means of an X2 interface.

Layers of a radio interface protocol between the UE and the BS (or eNodeB) 20 can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Meanwhile, the EPC may include various constitutional elements. Among them, a mobility management entity (MME) 51, a serving gateway (S-GW) 52, a packet data network gateway (PDN GW) 53, and a home subscriber server (HSS) 54 are illustrated in FIG. 1.

The BS (or eNodeB) 20 is connected to the MME 51 of the EPC through an S1 interface, and is connected to the S-GW 52 through S1-U.

The S-GW 52 is an element that operates at a boundary point between a Radio Access Network (RAN) and a core network and has a function of maintaining a data path between an eNodeB 22 and the PDN GW 53. Furthermore, if a terminal (or User Equipment (UE)) moves in a region in which service is provided by the eNodeB 22, the S-GW 52 plays a role of a local mobility anchor point. That is, for mobility within an E-UTRAN (i.e., a Universal Mobile Telecommunications System (Evolved-UMTS) Terrestrial Radio Access Network defined after 3GPP release-8), packets can be routed through the S-GW 52. Furthermore, the S-GW 52 may play a role of an anchor point for mobility with another 3GPP network (i.e., a RAN defined prior to 3GPP release-8, for example, a UTRAN or Global System for Mobile communication (GSM) (GERAN)/Enhanced Data rates for Global Evolution (EDGE) Radio Access Network).

The PDN GW (or P-GW) 53 corresponds to the termination point of a data interface toward a packet data network. The PDN GW 53 can support policy enforcement features, packet filtering, charging support, etc. Furthermore, the PDN GW (or P-GW) 53 can play a role of an anchor point for mobility management with a 3GPP network and a non-3GPP network (e.g., an unreliable network, such as an Interworking Wireless Local Area Network (I-WLAN), a Code Division Multiple Access (CDMA) network, or a reliable network, such as WiMax).

In the network configuration of FIG. 1, the S-GW 52 and the PDN GW 53 have been illustrated as being separate gateways, but the two gateways may be implemented in accordance with a single gateway configuration option.

The MME 51 is an element for performing the access of a terminal to a network connection and signaling and control functions for supporting the allocation, tracking, paging, roaming, handover, etc. of network resources. The MME 51 controls control plane functions related to subscribers and session management. The MME 51 manages numerous eNodeBs 22 and performs conventional signaling for selecting a gateway for handover to another 2G/3G networks. Furthermore, the MME 51 performs functions, such as security procedures, terminal-to-network session handling, and idle terminal location management.

Meanwhile, high-speed data traffic is very drastically increasing in recent years. To deal with such an increase in traffic, technologies are introduced to offload traffic of a UE onto a WLAN (Wi-Fi).

The P-GW 53 and the HSS 54 are connected to an access authentication authorization (AAA) server 56. The P-GW 53 and the AAA server 56 may be connected to an evolved packet data gateway (e-PDG) 57. The ePDG 57 serves as a security node for an untrusted non-3GPP network (for example, a WLAN, Wi-Fi, or the like). The ePDG 57 may be connected to a WLAN access gateway (WAG) 58. The WAG 58 may serve as a P-GW in a Wi-Fi system.

As described with reference to FIG. 1, a terminal (or UE) having IP capability may access an IP service network (for example, an IMS) provided by a service provider (that is, an operator) via various components in an EPC based on not only 3GPP access but also non-3GPP access.

FIG. 1 also illustrates various reference points (for example, S1-U, S1-MME, and the like). In the 3GPP system, a conceptual link connecting two functions of different functional entities of the E-UTRAN and the EPC is defined as a reference point. Table 1 below summarizes the reference points illustrated in FIG. 1. There may be various reference points according to a network structure in addition to the examples in Table 1.

TABLE 1

| Reference Point | Description |
| --- | --- |
| S1-MME | Reference point for the control plane protocol between E-UTRAN and MME |
| S1-U | Reference point between E-UTRAN and Serving GW for the per bearer user plane tunnelling and inter eNodeB path switching during handover |
| S3 | It enables user and bearer information exchange for inter 3GPP access network mobility in Idle and/or active state. This reference point can be used intra-PLMN or inter-PLMN (e.g. in the case of Inter-PLMN HO) |
| S4 | It provides related control and mobility support between GPRS Core and the 3GPP Anchor function of Serving GW. In addition, if Direct Tunnel is not established, it provides the user plane tunnelling. |
| S5 | It provides user plane tunnelling and tunnel management between Serving GW and PDN GW. It is used for Serving GW relocation due to UE mobility and if the Serving GW needs to connect to a non-collocated PDN GW for the required PDN connectivity. |
| S11 | A reference point between the MME and the S-GW |
| SGi | It is the reference point between the PDN GW and the packet data network. Packet data network may be an operator external public or private packet data network or an intra operator packet data network, e.g. for provision of IMS services. This reference point corresponds to Gi for 3GPP accesses. |

FIG. 2 is an exemplary diagram showing the architecture of a common E-UTRAN and a common the EPC.

As shown in FIG. 2, the eNodeB 20 can perform functions, such as routing to a gateway while RRC connection is activated, the scheduling and transmission of a paging message, the scheduling and transmission of a broadcast channel (BCH), the dynamic allocation of resources to UE in uplink and downlink, a configuration and providing for the measurement of the eNodeB 20, control of a radio bearer, radio admission control, and connection mobility control. The EPC can perform functions, such as the generation of paging, the management of an LTE_IDLE state, the ciphering of a user plane, control of an EPS bearer, the ciphering of NAS signaling, and integrity protection.

FIG. 3 is an exemplary diagram showing the structure of a radio interface protocol in a control plane between UE and an eNodeB, and FIG. 4 is another exemplary diagram showing the structure of a radio interface protocol in a control plane between UE and an eNodeB.

The radio interface protocol is based on a 3GPP radio access network standard. The radio interface protocol includes a physical layer, a data link layer, and a network layer horizontally, and it is divided into a user plane for the transmission of information and a control plane for the transfer of a control signal (or signaling).

The protocol layers may be classified into a first layer (L1), a second layer (L2), and a third layer (L3) based on three lower layers of the Open System Interconnection (OSI) reference model that is widely known in communication systems.

The layers of the radio protocol of the control plane shown in FIG. 3 and the radio protocol in the user plane of FIG. 4 are described below.

The physical layer PHY, that is, the first layer, provides information transfer service using physical channels. The PHY layer is connected to a Medium Access Control (MAC) layer placed in a higher layer through a transport channel, and data is transferred between the MAC layer and the PHY layer through the transport channel. Furthermore, data is transferred between different PHY layers, that is, PHY layers on the transmitter side and the receiver side, through the PHY layer.

A physical channel is made up of multiple subframes on a time axis and multiple subcarriers on a frequency axis. Here, one subframe is made up of a plurality of symbols and a plurality of subcarriers on the time axis. One subframe is made up of a plurality of resource blocks, and one resource block is made up of a plurality of symbols and a plurality of subcarriers. A Transmission Time Interval (TTI), that is, a unit time during which data is transmitted, is 1 ms corresponding to one subframe.

In accordance with 3GPP LTE, physical channels that are presented in the physical layer of the transmitter side and the receiver side can be divided into a Physical Downlink Shared Channel (PDSCH) and a Physical Uplink Shared Channel (PUSCH), that is, data channels, and a Physical Downlink Control Channel (PDCCH), a Physical Control Format Indicator Channel (PCFICH), a Physical Hybrid-ARQ Indicator Channel (PHICH), and a Physical Uplink Control Channel (PUCCH), that is, control channels.

A PCFICH that is transmitted in the first 01-DM symbol of a subframe carries a Control Format Indicator (CFI) regarding the number of OFDM symbols (i.e., the size of a control region) used to transmit control channels within the subframe. A wireless device first receives a CFI on a PCFICH and then monitors PDCCHs.

Unlike a PDCCH, a PCFICH is transmitted through the fixed PCFICH resources of a subframe without using blind decoding.

A PHICH carries positive-acknowledgement (ACK)/negative-acknowledgement (NACK) signals for an uplink (UL) Hybrid Automatic Repeat reQuest (HARQ). ACK/NACK signals for UL data on a PUSCH that is transmitted by a wireless device are transmitted on a PHICH.

A Physical Broadcast Channel (PBCH) is transmitted in four former OFDM symbols of the second slot of the first subframe of a radio frame. The PBCH carries system information that is essential for a wireless device to communicate with an eNodeB, and system information transmitted through a PBCH is called a Master Information Block (MIB). In contrast, system information transmitted on a PDSCH indicated by a PDCCH is called a System Information Block (SIB).

A PDCCH can carry the resource allocation and transport format of a downlink-shared channel (DL-SCH), information about the resource allocation of an uplink shared channel (UL-SCH), paging information for a PCH, system information for a DL-SCH, the resource allocation of an upper layer control message transmitted on a PDSCH, such as a random access response, a set of transmit power control commands for pieces of UE within a specific UE group, and the activation of a Voice over Internet Protocol (VoIP). A plurality of PDCCHs can be transmitted within the control region, and UE can monitor a plurality of PDCCHs. A PDCCH is transmitted on one Control Channel Element (CCE) or an aggregation of multiple contiguous CCEs. A CCE is a logical allocation unit used to provide a PDCCH with a coding rate according to the state of a radio channel A CCE corresponds to a plurality of resource element groups. The format of a PDCCH and the number of bits of a possible PDCCH are determined by a relationship between the number of CCEs and a coding rate provided by CCEs.

Control information transmitted through a PDCCH is called Downlink Control Information (DCI). DCI can include the resource allocation of a PDSCH (also called a downlink (DL) grant)), the resource allocation of a PUSCH (also called an uplink (UL) grant), a set of transmit power control commands for pieces of UE within a specific UE group, and/or the activation of a Voice over Internet Protocol (VoIP).

Several layers are presented in the second layer. First, a Medium Access Control (MAC) layer functions to map various logical channels to various transport channels and also plays a role of logical channel multiplexing for mapping multiple logical channels to one transport channel. The MAC layer is connected to a Radio Link Control (RLC) layer, that is, a higher layer, through a logical channel. The logical channel is basically divided into a control channel through which information of the control plane is transmitted and a traffic channel through which information of the user plane is transmitted depending on the type of transmitted information.

The RLC layer of the second layer functions to control a data size that is suitable for transmitting, by a lower layer, data received from a higher layer in a radio section by segmenting and concatenating the data. Furthermore, in order to guarantee various types of QoS required by radio bearers, the RLC layer provides three types of operation modes: a Transparent Mode (TM), an Un-acknowledged Mode (UM), and an Acknowledged Mode (AM). In particular, AM RLC performs a retransmission function through an Automatic Repeat and Request (ARQ) function for reliable data transmission.

The Packet Data Convergence Protocol (PDCP) layer of the second layer performs a header compression function for reducing the size of an IP packet header containing control information that is relatively large in size and unnecessary in order to efficiently transmit an IP packet, such as IPv4 or IPv6, in a radio section having a small bandwidth when transmitting the IP packet. Accordingly, transmission efficiency of the radio section can be increased because only essential information is transmitted in the header part of data. Furthermore, in an LTE system, the PDCP layer also performs a security function. The security function includes ciphering for preventing the interception of data by a third party and integrity protection for preventing the manipulation of data by a third party.

A Radio Resource Control (RRC) layer at the highest place of the third layer is defined only in the control plane and is responsible for control of logical channels, transport channels, and physical channels in relation to the configuration, re-configuration, and release of Radio Bearers (RBs). Here, the RB means service provided by the second layer in order to transfer data between UE and an E-UTRAN.

If an RRC connection is presented between the RRC layer of UE and the RRC layer of a wireless network, the UE is in an RRC_CONNECTED state. If not, the UE is in an RRC_IDLE state.

An RRC state and an RRC connection method of UE are described below. The RRC state means whether or not the RRC layer of UE has been logically connected to the RRC layer of an E-UTRAN. If the RRC layer of UE is logically connected to the RRC layer of an E-UTRAN, it is called the RRC_CONNECTED state. If the RRC layer of UE is not logically connected to the RRC layer of an E-UTRAN, it is called the RRC_IDLE state. Since UE in the RRC_CONNECTED state has an RRC connection, an E-UTRAN can check the existence of the UE in a cell unit, and thus control the UE effectively. In contrast, if UE is in the RRC_IDLE state, an E-UTRAN cannot check the existence of the UE, and a core network is managed in a Tracking Area (TA) unit, that is, an area unit greater than a cell. That is, only the existence of UE in the RRC_IDLE state is checked in an area unit greater than a cell. In such a case, the UE needs to shift to the RRC_CONNECTED state in order to be provided with common mobile communication service, such as voice or data. Each TA is classified through Tracking Area Identity (TAI). UE can configure TAI through Tracking Area Code (TAC), that is, information broadcasted by a cell.

When a user first turns on the power of UE, the UE first searches for a proper cell, establishes an RRC connection in the corresponding cell, and registers information about the UE with a core network. Thereafter, the UE stays in the RRC_IDLE state. The UE in the RRC_IDLE state (re) selects a cell if necessary and checks system information or paging information. This process is called camp on. When the UE in the RRC_IDLE state needs to establish an RRC connection, the UE establishes an RRC connection with the RRC layer of an E-UTRAN through an RRC connection procedure and shifts to the RRC_CONNECTED state. A case where the UE in the RRC_IDLE state needs to establish with an RRC connection includes multiple cases. The multiple cases may include, for example, a case where UL data needs to be transmitted for a reason, such as a call attempt made by a user and a case where a response message needs to be transmitted in response to a paging message received from an E-UTRAN.

A Non-Access Stratum (NAS) layer placed over the RRC layer performs functions, such as session management and mobility management.

The NAS layer shown in FIG. 3 is described in detail below.

Evolved Session Management (ESM) belonging to the NAS layer performs functions, such as the management of default bearers and the management of dedicated bearers, and ESM is responsible for control that is necessary for UE to use PS service from a network. Default bearer resources are characterized in that they are allocated by a network when UE first accesses a specific Packet Data Network (PDN) or accesses a network. Here, the network allocates an IP address available for UE so that the UE can use data service and the QoS of a default bearer. LTE supports two types of bearers: a bearer having Guaranteed Bit Rate (GBR) QoS characteristic that guarantees a specific bandwidth for the transmission and reception of data and a non-GBR bearer having the best effort QoS characteristic without guaranteeing a bandwidth. A default bearer is assigned a non-GBR bearer, and a dedicated bearer may be assigned a bearer having a GBR or non-GBR QoS characteristic.

In a network, a bearer assigned to UE is called an Evolved Packet Service (EPS) bearer. When assigning an EPS bearer, a network assigns one ID. This is called an EPS bearer ID. One EPS bearer has QoS characteristics of a Maximum Bit Rate (MBR) and a Guaranteed Bit Rate (GBR) or an Aggregated Maximum Bit Rate (AMBR).

FIG. 5a is a flowchart illustrating a random access process in 3GPP LTE.

The random access process is used for UE 10 to obtain UL synchronization with a base station, that is, an eNodeB 20, or to be assigned UL radio resources.

The UE 10 receives a root index and a physical random access channel (PRACH) configuration index from the eNodeB 20. 64 candidate random access preambles defined by a Zadoff-Chu (ZC) sequence are present in each cell. The root index is a logical index that is used for the UE to generate the 64 candidate random access preambles.

The transmission of a random access preamble is limited to specific time and frequency resources in each cell. The PRACH configuration index indicates a specific subframe on which a random access preamble can be transmitted and a preamble format.

The UE 10 sends a randomly selected random access preamble to the eNodeB 20. Here, the UE 10 selects one of the 64 candidate random access preambles. Furthermore, the UE selects a subframe corresponding to the PRACH configuration index. The UE 10 sends the selected random access preamble in the selected subframe.

The eNodeB 20 that has received the random access preamble sends a Random Access Response (RAR) to the UE 10. The random access response is detected in two steps. First, the UE 10 detects a PDCCH masked with a random access-RNTI (RA-RNTI). The UE 10 receives a random access response within a Medium Access Control (MAC) Protocol Data Unit (PDU) on a PDSCH that is indicated by the detected PDCCH.

FIG. 5b illustrates a connection process in a radio resource control (RRC) layer.

FIG. 5b shows an RRC state depending on whether there is an RRC connection. The RRC state denotes whether the entity of the RRC layer of UE 10 is in logical connection with the entity of the RRC layer of eNodeB 20, and if yes, it is referred to as RRC connected state, and if no as RRC idle state.

In the connected state, UE 10 has an RRC connection, and thus, the E-UTRAN may grasp the presence of the UE on a cell basis and may thus effectively control UE 10. In contrast, UE 10 in the idle state cannot grasp eNodeB 20 and is managed by a core network on the basis of a tracking area that is larger than a cell. The tracking area is a set of cells. That is, UE 10 in the idle state is grasped for its presence only on a larger area basis, and the UE should switch to the connected state to receive a typical mobile communication service such as voice or data service.

When the user turns on UE 10, UE 10 searches for a proper cell and stays in idle state in the cell. UE 10, when required, establishes an RRC connection with the RRC layer of eNodeB 20 through an RRC connection procedure and transits to the RRC connected state.

There are a number of situations where the UE staying in the idle state needs to establish an RRC connection, for example, when the user attempts to call or when uplink data transmission is needed, or when transmitting a message responsive to reception of a paging message from the EUTRAN.

In order for the idle UE 10 to be RRC connected with eNodeB 20, UE 10 needs to perform the RRC connection procedure as described above. The RRC connection procedure generally comes with the process in which UE 10 transmits an RRC connection request message to eNodeB 20, the process in which eNodeB 20 transmits an RRC connection setup message to UE 10, and the process in which UE 10 transmits an RRC connection setup complete message to eNodeB 20. The processes are described in further detail with reference to FIG. 6.

1) The idle UE 10, when attempting to establish an RRC connection, e.g., for attempting to call or transmit data or responding to paging from eNodeB 20, sends an RRC connection request message to eNodeB 20.

2) When receiving the RRC connection message from UE 10, eNodeB 20 accepts the RRC connection request from UE 10 if there are enough radio resources, and eNodeB 20 sends a response message, RRC connection setup message, to UE 10.

3) When receiving the RRC connection setup message, UE 10 transmits an RRC connection setup complete message to eNodeB 20. If UE 10 successfully transmits the RRC connection setup message, UE 10 happens to establish an RRC connection with eNodeB 20 and switches to the RRC connected state.

Meanwhile, when the UE 10 requests the RRC connection for the purpose of data transmission of the user plane, if the network, for example, the base station (that is, eNodeB) is in the congest state, the UE 10 may reject the request for the RRC connection.

FIG. 6a is an exemplary diagram showing general communication.

Referring to FIG. 6a, UE#1 10-1 is positioned in the coverage of eNodeB#1 20-1 and UE#2 10-2 is positioned in the coverage of eNodeB#2 20-2. Communication between UE#1 10-1 and UE#2 10-2 may be performed via a core network, for example, the S-GW 52/P-GW 53. A communication path via a core network may be referred to as an infrastructure data path. Further, communication through an infrastructure data path is referred to as infrastructure communication.

FIG. 6b illustrates the concept of proximity communication that is expected to be introduced in a next-generation communication system.

Growing demands from users for social network services (SNSs) cause requests for discovery of physically adjacent UEs and for a special application/service, that is, a proximity-based application/service, leading to a further increase in demands for proximity communication between UEs.

To meet the foregoing demands, as illustrated in FIG. 6b, there are discussed methods for enabling direct communications between UE#1 10-1, UE#2 10-2, and UE#3 10-3 or between UE#4 10-4, UE#5 10-5, and UE#6 10-6 without involvement of a BS (eNodeB) 20. Typically, it is possible to enable direct communication between UE#1 10-1 and UE#4 10-4 with the aid of the BS (eNodeB) 20. Meanwhile, UE#1 10-1 may also serve as a relay for UE#2 10-2 and UE#3 10-3, which are distant from the center of a cell. Likewise, UE#4 10-4 may also serve as a relay for UE#5 (10-5) and UE#6 (10-6), which are distant from the center of the cell.

Meanwhile, in a case in which the UE#1 10-1 and the UE#7 10-7 in direction communication become away from each other, they should switch a current path to an intrastructure path to continue to perform communication. However, a procedure therefor has not been proposed, causing a problem in which communication is disconnected. In addition, when direct communication is performed, since the UE#1 10-1 and the UE#7 10-7 are in an RRC idle state with respect to the BS (eNodeB), and thus, in order to switch the current path to the intrastructure path, the UE#1 10-1 and the UE#7 10-7 should switch to an RRC connected state. Here, however, when the BS is congested, the BS may reject an RRC connection request message from the UE#1 10-1 and the UE#7 10-7, and as a result, a service may be interrupted.

SUMMARY OF THE INVENTION

Therefore, one disclosure of the present specification is aimed at suggesting a solution to the aforementioned problem.

In an aspect, a method for performing a proximity service based on near-field communication (NFC) by a user equipment is provided. The method may include: transferring, by an access stratum (AS) layer of a user equipment (UE), information regarding a communication state with another UE to an upper layer through a non-access stratum (NAS) layer, while the UE communicates with the other UE through a direct communication path; receiving, by the NAS layer, a notification regarding switching of the communication path from the upper layer; instructing, by the NAS layer, the AS layer to perform a radio resource control (RRC) connection procedure in a request time (call type) which indicates the purpose of service continuity in accordance with the switching of the communication path; transmitting, by the AS layer, an RRC connection request message including a connection request type (establishment cause) which indicates the purpose of the service continuity of the proximity service to a base station (BS); and when establishing the RRC connection is completed, transmitting a path switching request message to a server responsible for a proximity service.

The RRC connection request message having the connection request type (establishment cause) which indicates the purpose of service continuity in accordance with the switching of the communication path may be preferentially processed by the BS over an RRC connection request message of a certain UE.

The upper layer may be a ProSe layer. In this case, the method may further include: determining, by the ProSe layer, whether to continue the service through switching of the communication path.

The information regarding a communication state with the other UE transferred by the AS layer to the upper layer through the NAS layer may include one or more of information regarding strength of a signal received through the direct communication path from the other UE and information indicating unavailability of the direct communication path with the other UE.

The method may further include: receiving a response message regarding the path switching request message from the server responsible for a proximity service. The response message may include information required for path switching.

The method may further include: when switching the direct communication path with the other UE to an evolved packet core (EPC) path is completed, receiving traffic from the other UE, from a proximity service media gateway within an EPC.

In another aspect, a user equipment (UE) performing a proximity service based on near-field communication (NFC) is provided. The UE may include a transceiver unit; and a processor controlling the transceiver unit. The processor may include: an access strantum (AS) layer transferring information regarding a communication state with another UE, while communicating with the other UE through a direct communication path; and an NAS layer transferring information regarding a communication state with the other UE when the information is received from the AS layer, and instructing the AS layer to perform a radio resource control (RRC) connection procedure in a request type (call type) which indicates the purpose of service continuity in accordance with switching of the communication path when a notification regarding the switching of the communication path is received from the upper layer. Here, the AS layer may complete establishing the RRC connection by transmitting an RRC connection request message including a connection request type (establishment cause) which indicates the purpose of service continuity of the proximity service to a base station (BS), and accordingly, the upper layer may transmit a path switching request message to a server responsible for the proximity service.

According to a disclosure of the present specification, the aforementioned problem of the conventional technology is solved.

DESCRIPTION OF EXEMPLARY EMBODIMENTS

Figure 1:
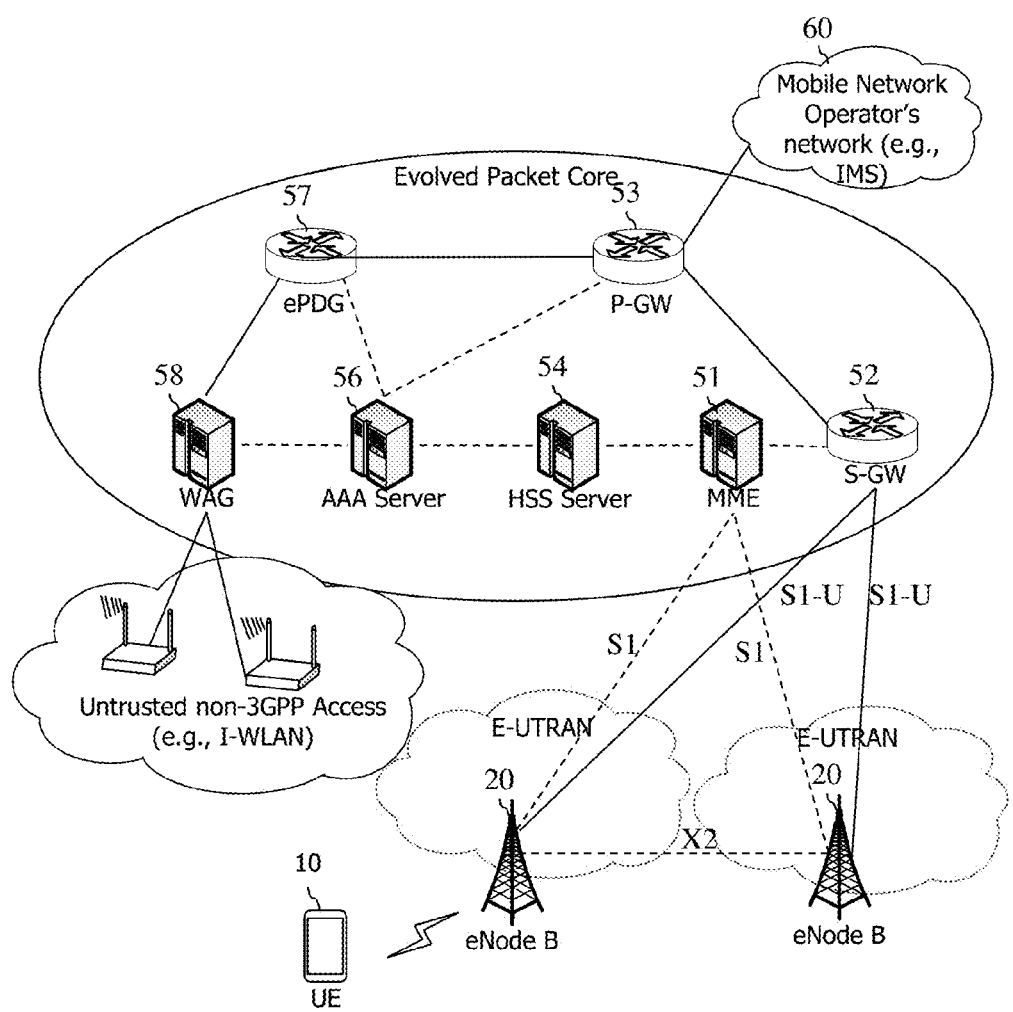
FIG. 1 shows the configuration of an evolved mobile communication network.
Figure 2:
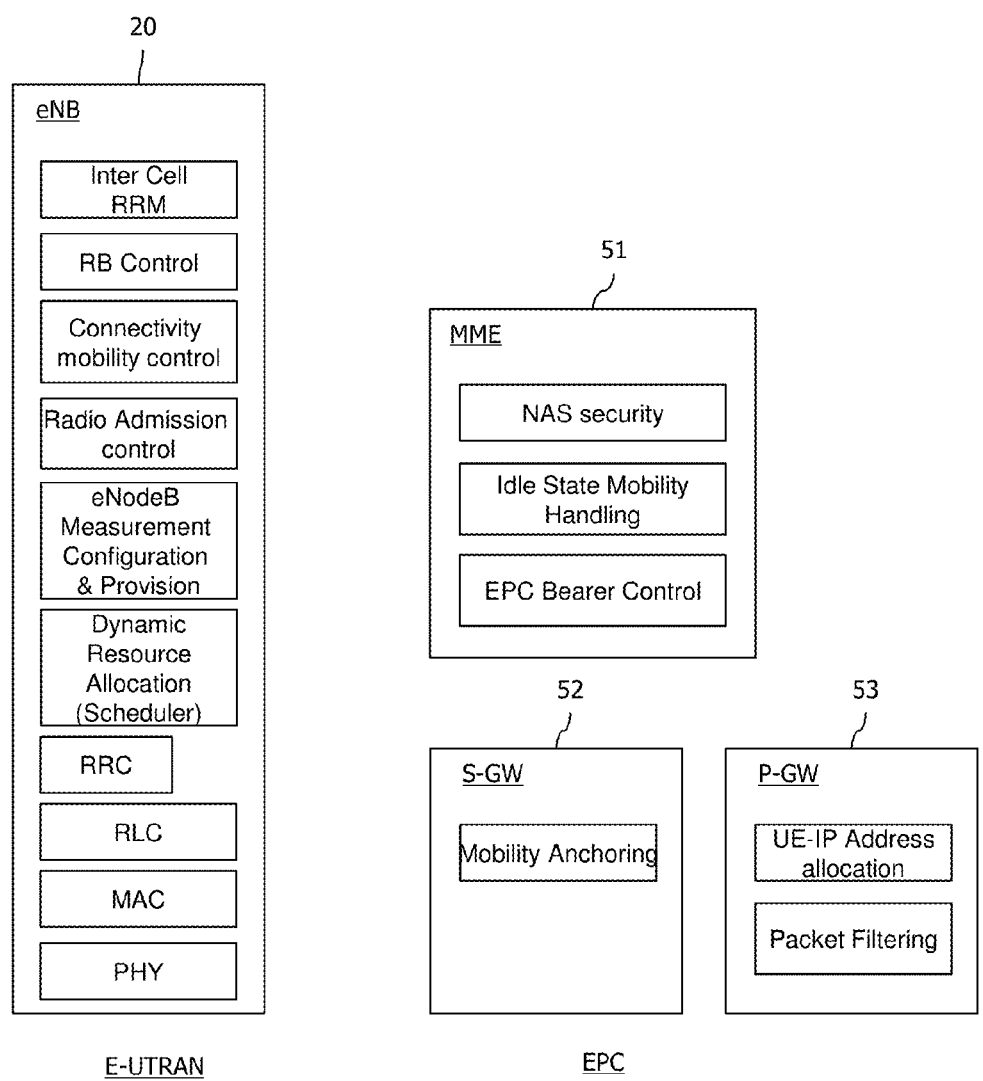
FIG. 2 is an exemplary diagram showing the architecture of a common E-UTRAN and a common EPC.
Figure 3:
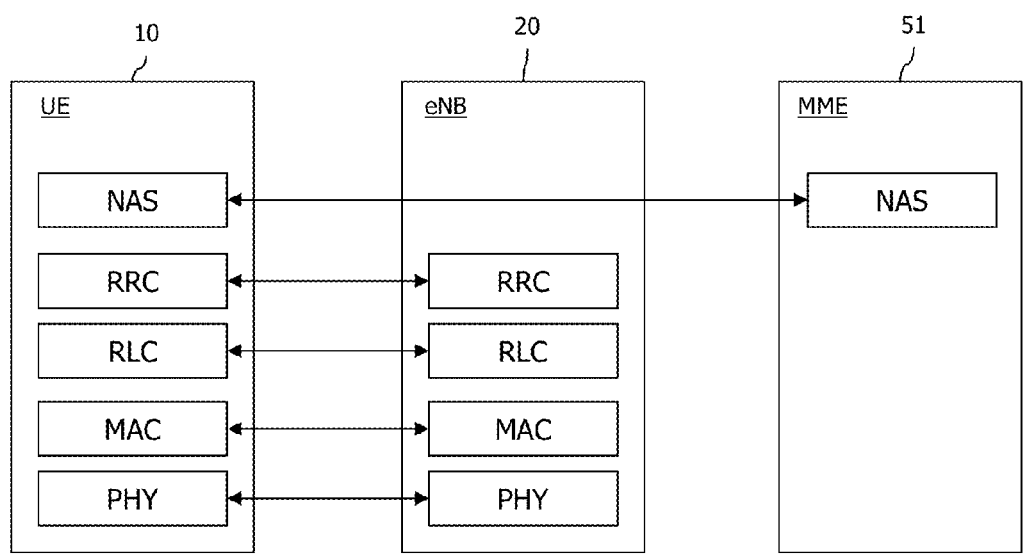
FIG. 3 is an exemplary diagram showing the structure of a radio interface protocol in a control plane between a UE and an eNodeB.
Figure 4:
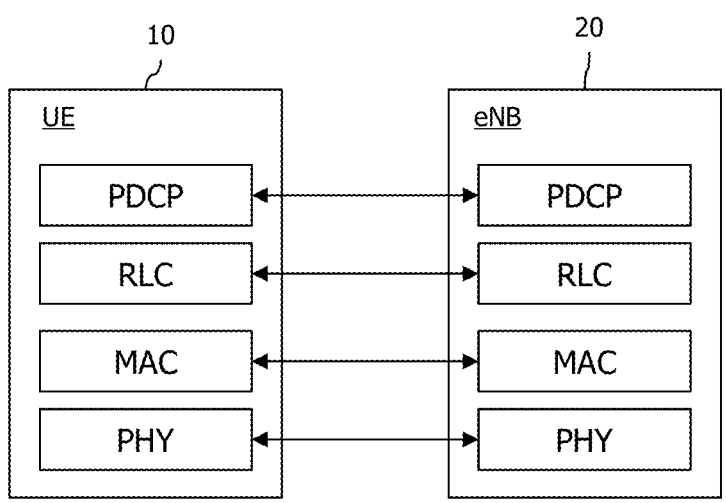
FIG. 4 is another exemplary diagram showing the structure of a radio interface protocol in a control plane between a UE and an eNodeB.
Figure 5A:
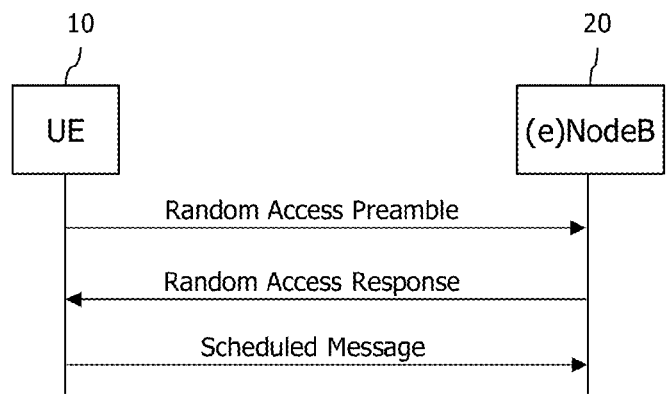
FIG. 5a is a flowchart illustrating a random access process in 3GPP LTE.
Figure 5B:
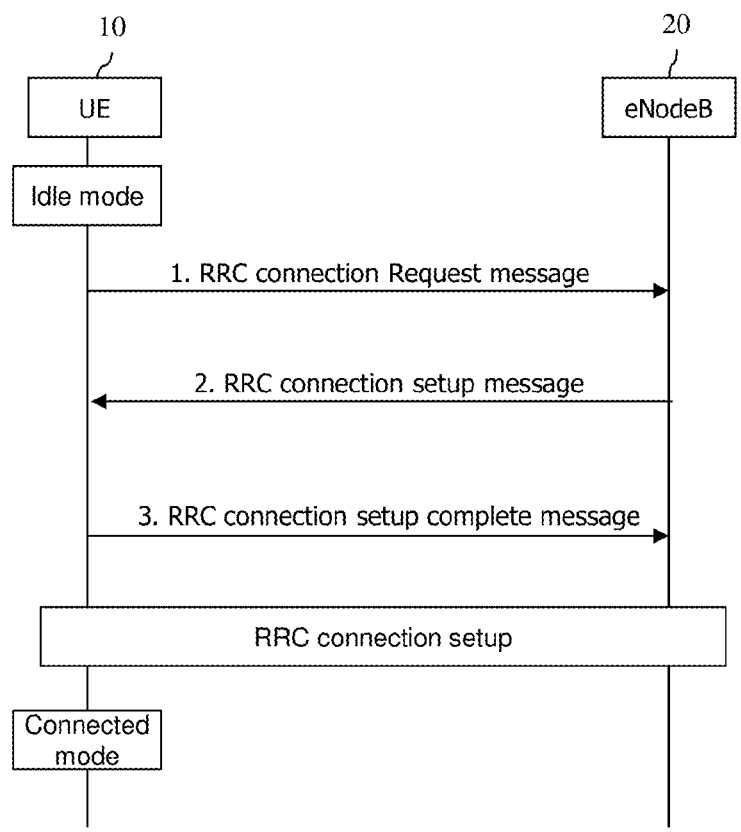
FIG. 5b illustrates a connection process in a radio resource control (RRC) layer.
Figure 6A:
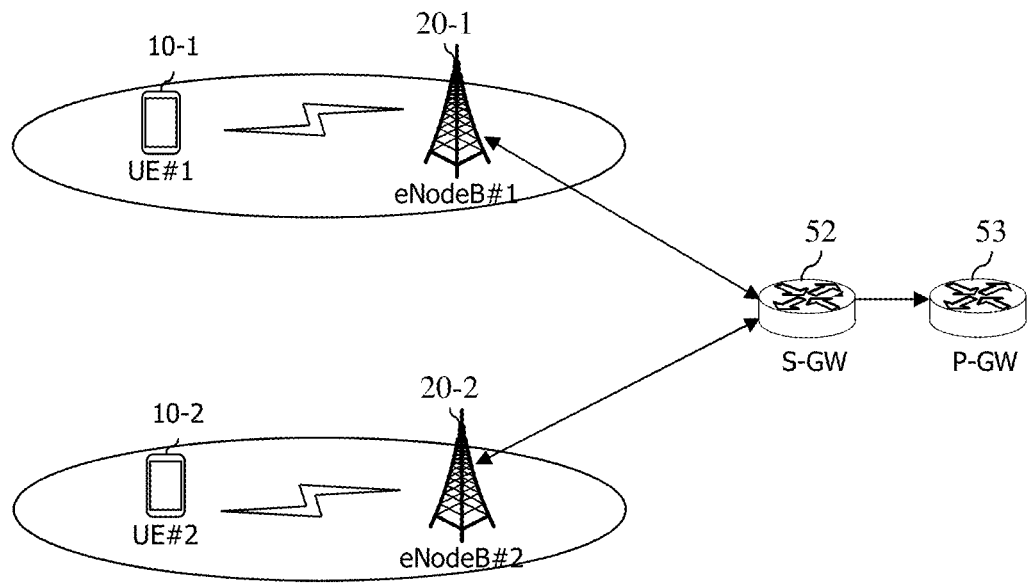
FIG. 6a is an exemplary diagram showing general communication.
Figure 6B:
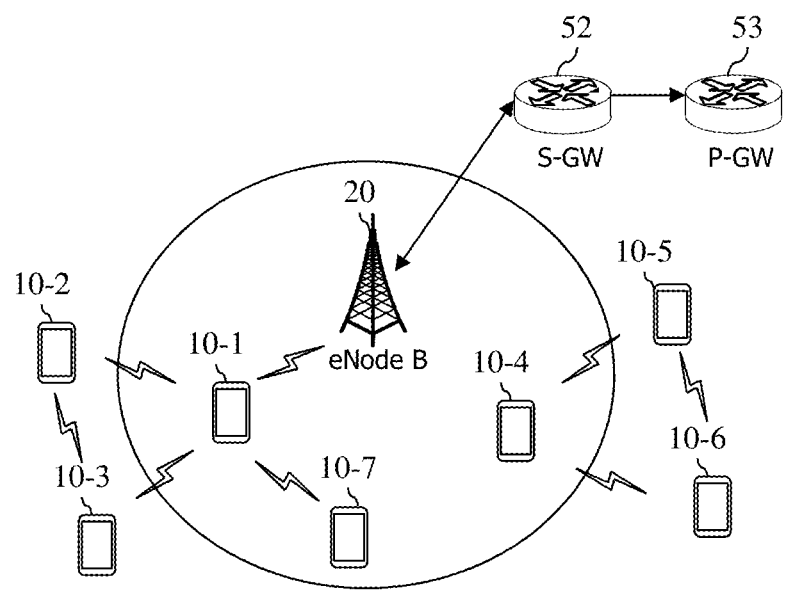
FIG. 6b illustrates the concept of proximity communication that is expected to be introduced in a next-generation communication system.

The present invention is described in light of UMTS (Universal Mobile Telecommunication System) and EPC (Evolved Packet Core), but not limited to such communication systems, and may be rather applicable to all communication systems and methods to which the technical spirit of the present invention may apply.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

In the drawings, user equipments (UEs) are shown for example. The UE may also be denoted a terminal or mobile equipment (ME). The UE may be a laptop computer, a mobile phone, a PDA, a smartphone, a multimedia device, or other portable device, or may be a stationary device such as a PC or a car mounted device.

Definition of Terms

For a better understanding, the terms used herein are briefly defined before going to the detailed description of the invention with reference to the accompanying drawings.

A GERAN: an abbreviation of a GSM EDGE Radio Access Network, and it refers to a radio access section that connects a core network and UE by GSM/EDGE.

A UTRAN: an abbreviation of a Universal Terrestrial Radio Access Network, and it refers to a radio access section that connects the core network of the 3rd generation mobile communication and UE.

An E-UTRAN: an abbreviation of an Evolved Universal Terrestrial Radio Access Network, and it refers to a radio access section that connects the core network of the 4th generation mobile communication, that is, LTE, and UE.

UMTS: stands for Universal Mobile Telecommunication System and means a 3rd generation mobile communication network.

UE/MS: User Equipment/Mobile Station. Means a terminal device.

EPC: stands for Evolved Packet Core and means a core network supportive of a long term evolution (LTE) network. An evolved version of UMTS.

PDN (Public Data Network): an independent network in which a service providing server is located.

PDN connection: connection from UE to PDN, i.e., association (connection) between a UE represented with an IP address and a PDN represented with an APN (access point name).

PDN-GW (Packet Data Network Gateway): a network node of an EPS network performing functions such as UE IP address allocation, packet screening & filtering, and charging data collection.

Serving GW (Serving Gateway): a network node of an EPS network performing functions such as mobility anchor, packet routing, idle mode packet buffering, and triggering MME to page UE.

APN (Access Point Name): name of an access point managed by a network, provided from a UE, i.e., a character string for denoting a PDN or distinguishing a PDN from another. Accessing a requested service or network (PDN) gets through a corresponding P-GW, and an APN is a name (e.g., internet.mnc012.mcc345.gprs) pre-defined in the network to be able to discover the P-GW.

NodeB: a UMTS network base station. A NodeB is installed outdoors and corresponds in cell coverage size to a macro cell.

eNodeB: an EPS (Evolved Packet System) base station and is installed outdoors. An eNodeB corresponds in cell coverage size to a macro cell.

(e) NodeB: collectively denotes NodeB and eNodeB.

MME: stands for Mobility Management Entity and plays a role to control each entity in an EPS to provide mobility and session for a UE.

Session: a pathway for data transmission. The unit of session may include PDN, bearer, and IP flow which respectively correspond the unit of the overall target network (unit of APN or PDN), the unit distinguished by QoS therein (unit of bearer), and unit of destination IP address.

PDN connection: a connection from a UE to a PDN, i.e., an association (connection) between a UE represented with an IP address and a PDN represented with an APN. This means a connection (UE-PDN GW) between entities in a core network to form a session.

UE Context: information on UE's context used to manage UE in network, i.e., context information consisting of UE id, mobility (e.g., current location), and session attribute (QoS, or priority).

NAS (Non-Access-Stratum): upper stratum of a control plane between a UE and an MME. Supports mobility management, session management, IP address management, etc. between a UE and a network.

RAT: an abbreviation of Radio Access Technology. Means GERAN, UTRAN, E-UTRAN, etc.

Proximity service (Proximity Service, ProSe Service or Proximity based Service): means discovery and mutually direct communication between physically adjacent UEs. However, the proximity service is a concept including communication between UEs through a base station and, furthermore, a concept including communication between UEs through a third UE. Here, data on a user plane is exchanged through a direct data path without passing through a 3GPP core network (e.g. EPC).

Proximity: That a UE is located in close proximity to another UE means when a predetermined proximity condition is met. A proximity condition for discovery may be different from a proximity condition for communication.

Range Class: means a rough distance range as a use for ProSe discovery, for example, a geographical distance range, and a distance range as a communication condition.

ProSe-enabled UE: means a UE supporting ProSe discovery, ProSe communication and/or ProSe-supported WLAN direct communication. In the present specification, the ProSe-enabled UE is also referred to as UE simply.

Announcing UE: a UE that notifies of information that can be used by adjacent UEs having discovery rights.

Monitoring UE: a UE that receives interested information from other adjacent UEs.

ProSe-enabled Network: means a network supporting ProSe discovery, ProSe communication and/or ProSe-supported WLAN direct communication. In the present specification, the ProSe-enabled Network is also referred to as network simply.

ProSe discovery: refers to a process of discovering a ProSe-enabled UE when it is closely located.

Open ProSe Discovery: means that it is possible to discover a ProSe-enabled UE without a direct permission when detecting it.

Restricted ProSe Discovery: means that it is possible to discover a ProSe-enabled UE only with a direct permission when detecting it.

ProSe Communication: means performing communication between UEs using an E-UTRAN communication path when a ProSe-enabled UE is closely located. A communication path may be established, for example, directly between UEs or via a local (or neighbor) eNodeB.

ProSe Group Communication: means performing one-to-all group communication using a common communication path established between two or more ProSe-enabled UEs when they are located adjacent to each other.

ProSe E-UTRA communication: means ProSe communication using an E-UTRA communication path.

ProSe-assisted WLAN direct communication: means ProSe communication using a WLAN direct communication path.

ProSe communication path: means a communication path supporting ProSe communication. A path of the ProSe E-UTRA communication can be established directly between ProSe-enabled UEs by using an E-UTRA or an eNodeB. A path of the ProSe-assisted WLAN direct communication can be established directly between the ProSe-enabled UEs via a WLAN.

EPC path (or infrastructure data path): mans a communication path of a user plane via EPC.

ProSe relay: may have two types as a UE capable of operating as a relay for ProSe.

ProSe UE-to-Network Relay: means playing a role of a communication repeater between a ProSe-enabled Network and a ProSe-enabled UE.

ProSe UE-to-UE Relay: means playing a role of a communication repeater between ProSe-enabled UEs.

Meanwhile, the embodiments of the present invention are described with reference to the drawings below.

Figure 7A:
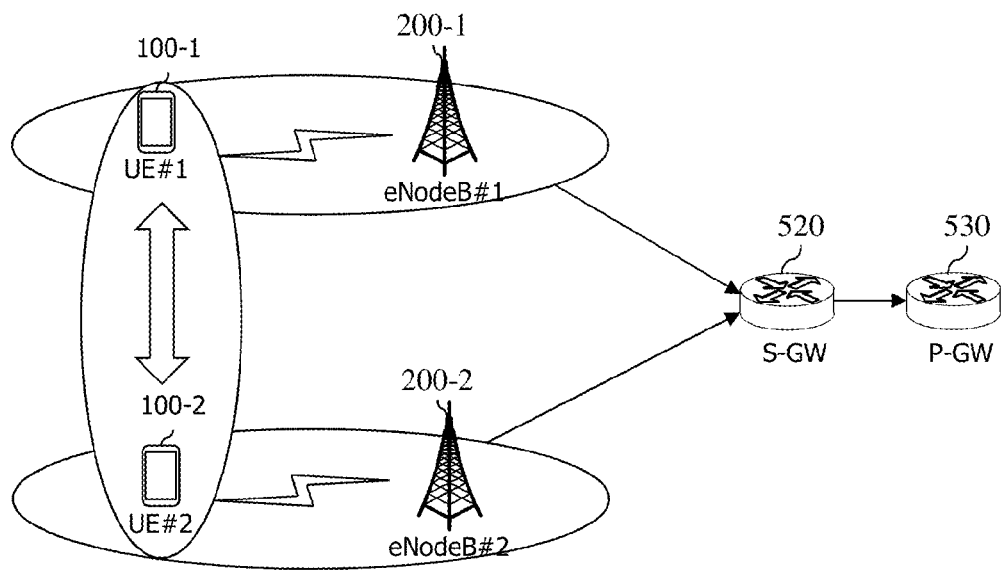
FIG. 7a is an exemplary diagram showing an example of proximity communication.
Figure 7B:
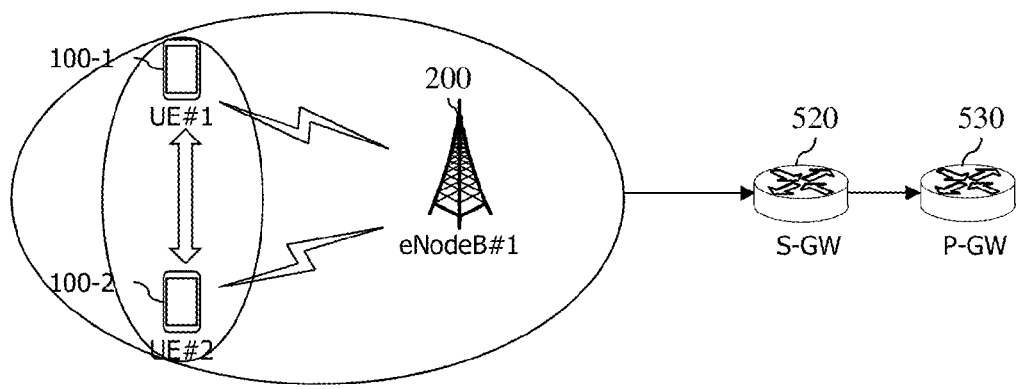
FIG. 7b is an exemplary diagram showing another example of proximity communication.

FIG. 7a is an exemplary diagram showing an example of proximity communication, and FIG. 7b is an exemplary diagram showing another example of proximity communication.

Referring to FIG. 7a, there is illustrated a situation that a UE#1 100-1 and a UE#2 100-2 perform proximity communication through a direct communication path while camping on different eNodeBs, respectively. Referring to FIG. 7b, there is shown a situation that a UE#1 100-1 and a UE#2 100-2 perform proximity communication through a direct communication path while camping on an eNodeB 200, respectively.

As such, the UE#1 100-1 and the UE#2 100-2 may perform proximity communication through a direct communication path bypassing a path through an eNodeB and a core network that a service provider operates.

The term, direct communication path, may be variously referred to as data path for proximity service, data path based on proximity service or proximity service communication path. Furthermore, communication through the direct communication path may be variously called direct communication, proximity service communication or proximity service-based communication.

Meanwhile, an example of a proximity service may be a safety-related service. For example, when a UE user having an emergency is out of the coverage of a base station (BS), the user may transmit a distress signal, which indicates that the user is in an emergency, to another UE through the proximity service. Further, when a UE user is dispatched for a rescue but is out of the coverage of a BS, the user may transmit a distress signal to another UE through the proximity service to inform other rescue workers of the emergency or to make a request for rescue.

Another example of a proximity service may be a social network service (SNS). The SNS causes very frequent data transmissions, thus increasing loads of a BS. Thus, a direct proximity service between UEs without intervention of a BS may reduce loads of a BS.

As still another example of a proximity service, a group communication service may be used. Further, an example of the group communication service may include a Push-To-Talk (PTT) service. Describing group communication with reference to the PTT service, for example, one UE as a talking part may transmit media (for example, a sound or the like) and a plurality of other UEs may receive the media from the talking party UE. Here, a plurality of UEs is not allowed to simultaneously transmit media as talking parties.

Figure 8A:
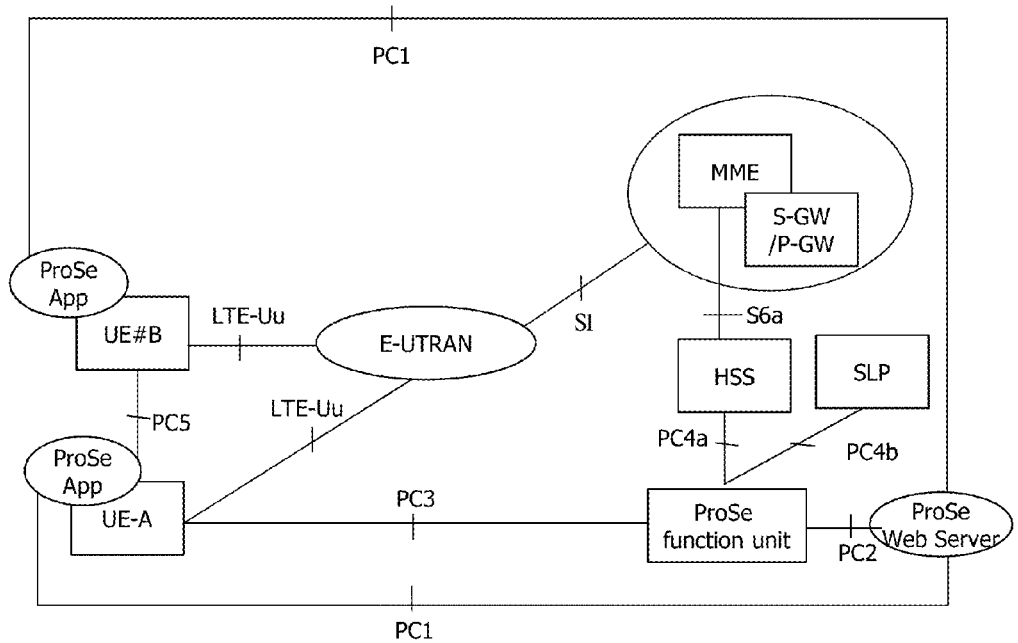
FIG. 8A is a block diagram illustrating an architecture for a proximity service.
Figure 8B:
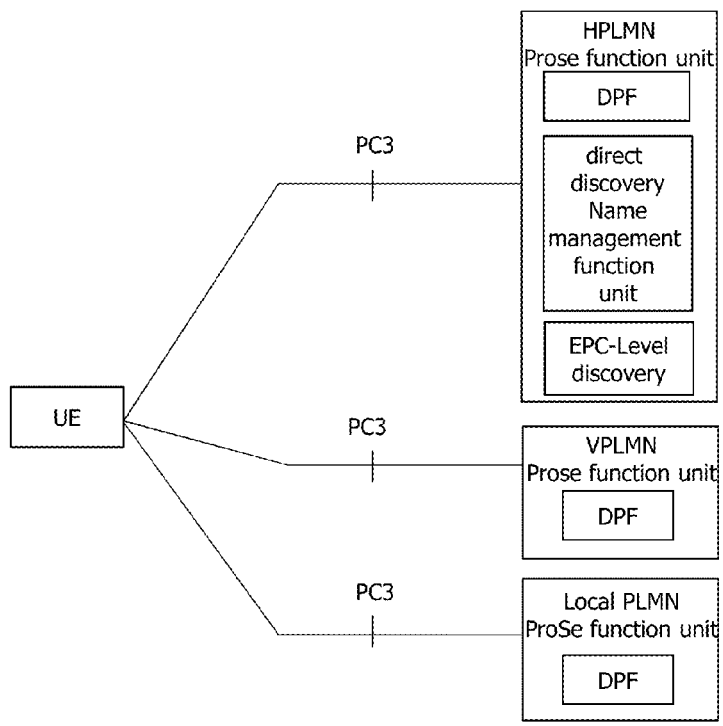
FIG. 8B is a block diagram specifically illustrating a ProSe function unit illustrated in FIG. 8A.

FIG. 8A is a block diagram illustrating an architecture for a proximity service, and FIG. 8B is a block diagram specifically illustrating a ProSe function unit illustrated in FIG. 8A.

Referring to FIG. 8A, both of a UE-A and a UE-B has a ProSe application. The ProSe application communicates with a ProSe function unit through a PC interface.

The ProSe function unit illustrated in FIG. 8A is newly defined for ProSe, and as illustrated in FIG. 8B, the ProSe function unit may be divided into three sub-function units. Roles of the sub-function units are as follows.

First, a direct provisioning function (DPF) serves to provide a parameter required for a UE so that the UE may use ProSe direct discovery and ProSe direct communication. The parameter allows the UE to use ProSe within a specific PLMN. In a situation in which the UE cannot be served by an E-UTRAN, a parameter for direct communication used for a public safety DPF may be provided to the UE.

Second, a direct discovery name management (DDNM) function unit serves to allocate a ProSe application ID and a ProSe application code for the purpose of open ProSe direct discovery and handle the same. Thus, the DDNM function unit may use ProSe-related subscriber information stored in an HSS to handle each discovery request. Also, the DDNM function unit provides security information required for a UE in order to protect discovery messages transmitted wirelessly.

An EPC-level discovery ProSe function unit has PC2, an interface for an application server, PC4a, an interface for the HSS, and PC3, an interface for a UE. The EPC-level discovery ProSe function unit plays the following roles.

It stores ProSe-related subscriber data obtained from the HSS

Figure 9A:
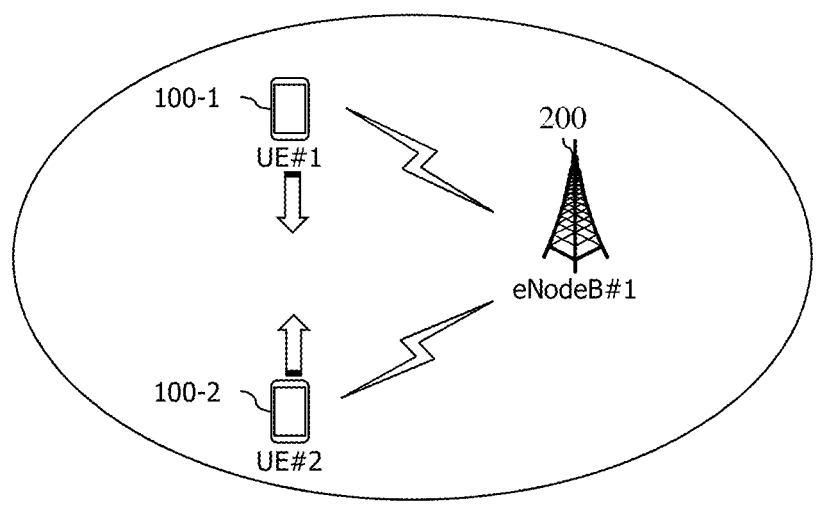
FIG. 9A is a view illustrating an example in which direct communication for a proximity service is triggered.
Figure 9B:
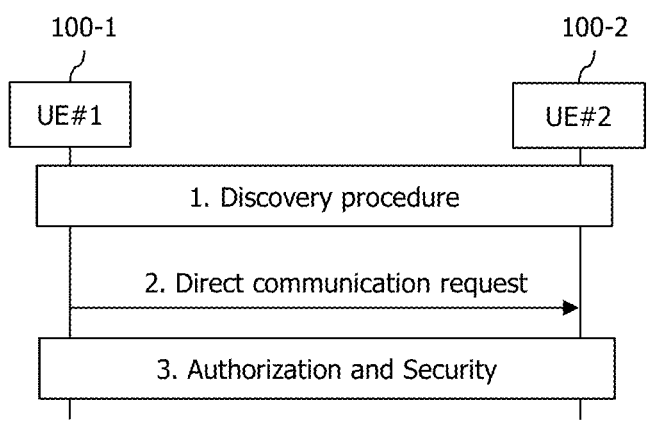
FIG. 9B is a view illustrating a process of configuring direct communication for a proximity service.

It performs authorization and setting for the purpose of PC-level ProSe discovery and EPC-assisted WLAN direct discovery and communication It stores a list of applications allowed to use PC-level ProSe discovery and EPC-assisted WLAN direct discovery and communication It operates as a service client for the purpose of EPC-level ProSe discovery It provides information for supporting WLAN direct discovery and communication to a UE It deals with an EPC ProSe subscriber ID and an application layer user ID It performs a security-related function It communicates with a UE through a PC3 interface It communicates with a third application server through a PC2 interface It communicates with a ProSe function unit within a different PLMN through a PC6 interface It supports a function for requesting a UE location through the HSS It performs a billing-related function FIG. 9A is a view illustrating an example in which direct communication for a proximity service is triggered, and FIG. 9B is a view illustrating a process of configuring direct communication for a proximity service.

As illustrated in FIG. 9A, when a UE#1 100-1 and a UE#2 100-2 become close to each other, direct communication for a proximity service may be triggered.

Referring to FIG. 9B, the UE#1 100-1 and the UE#2 100-2 discover that they become close to each other through a discovery procedure.

Then, any one of them, i.e., the UE#1 100-1 may transmit a direct communication request message to the other UE, i.e., the UE#2 100-2.

Here, in order to transmit the direct communication request message, the UE#1 100-1 should know a layer 2 ID of the UE#2 100-2. The layer 2 ID may be an ID which has been obtained during the discovery procedure. Alternatively, the layer 2 ID may be an ID which has been obtained during a one-to-many communication process which was performed with the UE#2 100-2 before then.

Then, the UE# 100-2 initiates a mutual authorization procedure. When the authorization procedure is successfully completed, a safe layer 2 link is generated on the PC5 interface.

Meanwhile, direct communication between the UE#1 100-1 and the UE#2 100-2 is based on an IP address. An IPE address used in the direct communication is allocated by any one of the two UEs.

In this manner, the direct communication is based on an IP address newly allocated by any one UE, rather than based on IP address information obtained from a P-GW. The reason is because an IP communication network through an EPC path (i.e., an IP communication network allowing for IP routing between a UE and a P-GW) and an IP communication network through a ProSe path (i.e., an IP communication network allowing for direct IP routing between a UE and another UE) are different communication networks in terms of routing.

Figure 10:
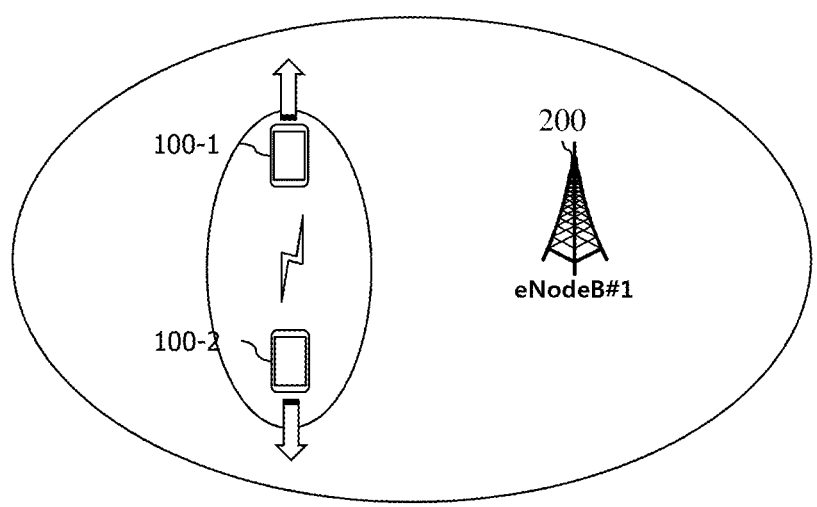
FIG. 10 is a view illustrating an example in which switching from a ProSe direct communication path to an EPC path is triggered.

For example, when an IP address used by the UE#1 100-1 to perform communication through the EPC path is an IP-Ae, an IP address used by the UE#1 100-1 to perform communication through the ProSe path is an IP-Ap, an IP address used by the UE#2 100-2 to perform communication through the EPC path is an IP-Be, and an IP address used by the UE#2 100-2 to perform communication through the ProSe path is an IP-Bp, a source IP address and a destination IP address should be set for the two UEs to communicate with each other.

i) In a case in which the UE#1 100-1 transmits traffic to the UE#2 100-2 through the ProSe path, a source IP address is IP-Ap and a destination IP address is IP-Bp ii) In a case in which the UE#2 100-2 transmits traffic to the UE#1 100-1 through the ProSe path, a source IP address is IP-Bp and a destination IP address is IP-Ap iii) In a case in which the UE#1 100-1 transmits traffic to the UE#2 100-2 through the EPC path, a source IP address is IP-Ae and a destination IP address is IP-Be iv) In a case in which the UE#2 100-2 transmits traffic to the UE#1 100-1 through the EPC path, a source IP address is IP-Be and a destination IP address is IP-Ae FIG. 10 is a view illustrating an example in which switching from a ProSe direct communication path to an EPC path is triggered.

Referring to FIG. 10, when the UE#1 100-1 and the UE#2 100-2, which are performing ProSe direct communication, become away from each other, they may reach a situation in which it is impossible for them to directly communicate with each other and they should perform communication through the EPC path.

IP address information used by the UE#1 100-1 and the UE#2 100-2 to communicate with each other through the EPC path is generally obtained from a network, i.e., the P-GW when a PDN connection is generated.

When the UE#1 100-1 and the UE#2 100-2, while exchanging traffic with each other through the ProSe path, become away from each other so they should exchange traffic through the EPC path, an address of an IP packet should be changed from the configuration of i) or ii) to the configuration iii) or iv) as described above, and in a case in which the IP address used by the UEs is changed, traffic exchanged during the change process may be lost until an application within the UEs discovers the change in the IP address. That is, traffic exchanged before an IP session regarding a corresponding application is re-formed may be lost, which may degrade user experience. In particular, when the UE#1 100-1 and UE#2 100-2, which is exchanging traffic through the ProSe path, suddenly become away from each other, they are too busy to change the IP address and transmit traffic, and thus, traffic is lost.

On the other hand, in order for the UE#1 100-1 and the UE#2 100-2 to communicate with each other through the EPC path, first, they should be switched from an RRC idle state to an RRC connected state.

To this end, each UE performs a service request procedure to request service continuity (that is, to request switching from the ProSe path to the EPC path) from the network. During the service request procedure, each UE transmits a service request message and an RRC connection request message as well. Table 2 below shows fields of the RRC connection request message.

TABLE 2

| Field | Description |
| --- | --- |
| Establishment cause | It is a cause indicating why an RRC connection request is required, which is provided by an upper layer |
| randomValue | Certain integer within a range from 0 to 240 |
| UE-Identity | UE identity included to facilitate contention resolution by lower layers |

In general, in a case in which a UE transmits an RRC connection request message to an eNodeB to perform a service request procedure, mo-Data is sett as a value of an establishment cause.

Here, however, even when the UE#1 100-1 or the UE#2 100-2 transmits an RRC connection request message as part of a service request procedure to request ProSe service continuity (i.e., request for switching the ProSe path to the EPC path) from the network, the value of the establishment cause field is set as mo-Data.

Thus, the eNodeB cannot determine whether the UE#1 100-1 or the UE#2 100-2 requests RRC connection for transmission of general data or whether the UE#1 100-1 or the UE#2 100-2 has requested RRC connection for ProSe service continuity.

In addition, in a network congested state, generally, the eNodeB may preferentially processes an RRC connection request message in which the establishment cause is set as emergency, highPriorityAccess, mt-Access, or mo-Signaling over an RRC connection request message in which the establishment cause is set as mo-Data, and may reject the RRC connection request message in which the establishment cause is set as mo-Data. Thus, the ProSe service of the UE#1 100-1 or the UE#2 100-2 may not be continued but be stopped.

Thus, the present disclosure proposes schemes for solving the aforementioned problem.

<Brief Description of Present Disclosure>

The present disclosure proposes a mechanism effectively providing service continuity with respect to a proximity service in a mobile communication system such as a 33GPP EPS (evolved packet system). The ProSe service continuity providing mechanism proposed in the present invention may be implemented as a combination of one or more of the following operations.

Hereinafter, among ProSe communication, one-to-one direct communication as direct communication using an E-UTRA and EPC-assisted WLAN one-to-one direct communication as direct communication using a WLAN will be largely described, but the present invention may also be applicable to one-to-many direct communication.

I. UE, which has performed direct communication through ProSe communication path, transmits message requesting path switching (or service continuity request message) to EPC path The path switching request message (or service continuity request message) may include one or more pieces of following information.

- Identification information of the UE which transmits the request message
- Identification information of a counterpart UE which is performing direct communication with the UE which transmits the request message
- Identification information (e.g., a reference ID, or the like) of direct communication as a target of the path switching (or service continuity)
- Information (e.g., a type of media, characteristics of media, and QoS information required for media) regarding media included in traffic as a target of the path switching (or service continuity)
- IP address information used for direct communication
- IP address information used by the counterpart UE for direct communication
- Port number information used for direct communication
- Port number information used by the counterpart UE for direct communication
- Information indicating that the path switching of the request is switching from a ProSe communication path to an EPC path
- Information regarding whether the UE, which requests the path switching, is a reception UE, a transmission UE, or both the reception UE and the transmission UE In addition to the aforementioned information, the UE may include various types of information required for requesting the path switching (or service continuity).

When the UE requesting the path switching is in an RRC idle state, the UE should be switched to an RRC connected state to transmit the request message, and to this end, the UE performs a service request procedure. Alternatively, in order to switch to the RRC connected state to request the path switching, the UE may perform a newly defined NAS procedure, instead of the service request procedure.

Meanwhile, according an embodiment of the present disclosure, the UE sets one of the following values, instead of mo-Data, as an establishment cause value within an RRC connection request message transmitted to the eNodeB during a service request procedure.

- An establishment cause value newly defined for requesting ProSe service continuity (e.g., proseServiceCont)
- mo-Signaling: The service request procedure is to transmit signaling for requesting ProSe service continuity to a ProSe function, and thus, the signaling is regarded as MO signaling and intended to be included.
- mt-Access: It is a value particularly included by a UE which unilaterally receives traffic in direct communication.

When the RRC connection request message including the establishment cause proposed according to an embodiment of the present invention is received, the eNodeB preferentially processes the RRC connection request message over an RRC connection request message of other UE in which the establishment cause is set as mo-Data even in a network congested situation, thus preventing the RRC connection request message for service continuity from being rejected.

The RRC establishment cause value set as mentioned above may be provided by an NAS layer to an AS layer or the AS layer may determine it by itself.

The UE performing ProSe may transmit the path switching request (or service continuity request) to the ProSe function unit on the basis of various reasons. Examples of the reasons may include when the UE detects that direct communication with a counterpart UE on direct communication is not available any longer, when the UE detects that packet loss in direct communication is a predetermined degree or greater, or when the UE detects that QoS of direct communication is a predetermined level or lower. Also, before initiating direct communication (or when direct communication is established), one of UEs performing direct communication may be determined to transmit the path switching request (or service continuity request) to the ProSe function unit. This may be determined through agreement between UEs or a network may designate the UE.

Meanwhile, an internal operation of a UE in a case in which the UE, which has performed communication through a direct communication path in an RRC idle state, requests path switching to the EPC path (or service continuity request) will be described with reference to FIG. 11.

Figure 11:
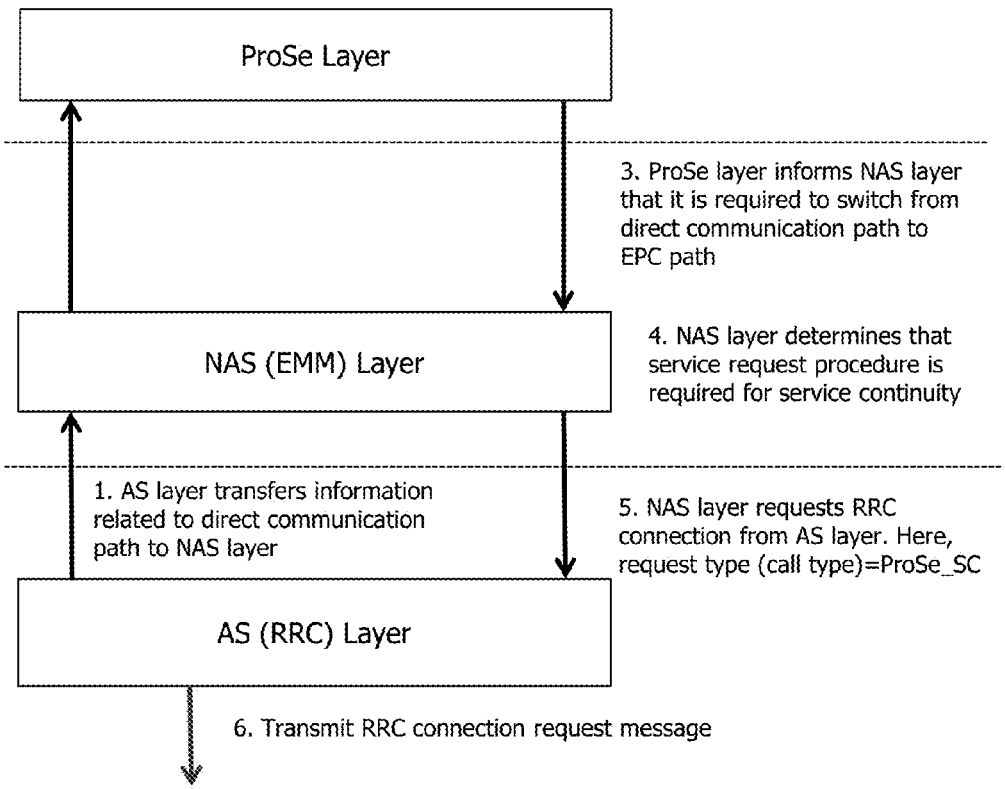
FIG. 11 is a view illustrating an internal operation of a UE for switching from a direct communication path to an EPC path according to an embodiment of the present disclosure.

FIG. 11 is a view illustrating an internal operation of a UE for switching from a direct communication path to an EPC path according to an embodiment of the present disclosure.

1) Referring to FIG. 11, an AS layer of the UE provides information regarding signal strength with respect to a counterpart UE on direct communication to an upper layer. The signal strength information may be periodically provided or when a certain threshold value is not satisfied (that is, when it is regarded that direct communication is not available any longer). In the latter case, the provided information may include information indicating unavailability of direct communication, in addition to the information regarding the signal strength. Alternatively, only the information indicating unavailability of direct communication may be transferred. The information may be provided by the AS layer to an NAS layer and the NAS layer may provide the information to a ProSe layer, or the AS layer may directly provide the information to the ProSe layer according to implementation of the UE.

2) The ProSe layer of the UE determines that path switching (or service continuity) from direct communication to the EPC path is required on the basis of one or more pieces of information below.

Signal strength information provided from a lower layer and/or information indicating unavailability of direct communication Packet loss information associated with direct communication QoS information associated with direct communication 3) The ProSe layer of the UE informs the NAS layer that path switching (or service continuity) from the direct communication path to the EPC path is required according to the determination.

4) The NAS layer of the UE then checks whether a current state is an EMM idle state, and when the current state is the EMM idle state, the NAS layer of the UE determines to perform a service request procedure for the purpose of service continuity.

5) The NAS layer of the UE subsequently requests the AS layer to perform an RRC connection request procedure for a service request. Here, the NAS layer of the UE provides information indicating that it relates to ProSe service continuity to the AS layer. The information may be reflected in a call type, for example, and provided.

6) The AS layer of the UE then transmits an RRC connection request message to the eNodeB on the basis of the request received from the NAS layer. Here, the AS layer sets a value indicating the RRC connection request for a ProSe service continuity operation, for example, proseServiceCont, within an establishment cause field of the RRC connection request message.

In the above, the case in which the UE transmits the path switching request (or service continuity request) to the ProSe function unit (or ProSe server) has been described, but alternatively, the UE may also transmit the path switching request (or service continuity request) to a different network node, for example, a network node that manages mobility such as an MME or an SGSN, a network node that maintains subscriber information such as an HSS, a server developed to provide group communication such as a group communication service enabler application server (GCSE AS), an authentication authorization accounting (AAA) server or an AAA proxy participating in authorization, or the like, an access network discovery and selection function (ANDSF) entity, a gateway node such as a P-GW, or the eNodeB. In this case, the different network node may transmit the request to the ProSe function unit responsible for the UE.

II. Path switching (or service continuity) operation of ProSe function: Allocation of resource required for communication through EPC path and transmission of information required for path switching (or service continuity) to UE Meanwhile, when the path switching request (or the service continuity request) is received from the UE, the ProSe function unit allocates resource regarding direct communication as a target of the path switching (or service continuity) to a media gateway (or media server) that the ProSe function unit manages. The media gateway may be co-located with the ProSe function unit or may be separately provided. In the present invention, the media gateway will be referred to as a ProSe MGW (Proximity-based Services Media GateWay). The allocated resource is IP address information and port number required for UEs to communicate with each other through an EPC path. If a plurality of media are targets for the direct communication, mutually different sets of IP address and port number may be allocated to each of the media, or the same IP address may be allocated to all the media and only IP addresses may be allocated to be different. In the above, only the IP address and port number are described as the allocated resource, but any other resource required for communication may also be allocated. Also, the port number may not be provided, and in this case, the UE may use an existing port number which has been used.

The ProSe function unit performs (1) or (2) below.

(1) The ProSe function unit transmits one or more pieces of following information to every UE participating in direct communication as a target of the path switching (or service continuity).

i) Information regarding the allocated IP address and port number ii) Other allocated resource information iii) Other information required for communication If a certain UE, among the UEs, is served by other ProSe function unit, the ProSe function unit may find out the other ProSe function unit (which may have been stored, which may be discovered through another network node, or which may be discovered through an application server), and subsequently transfer the aforementioned information to the UE through the other ProSe function unit. This is generally applied in the present invention.

Here, the ProSe function unit first transmits the information to a UE that performs transmission, rather than to a UE that performs reception, on the basis of the obtained information (for which path switching or service continuity is requested, for example) as described above. This is to minimize a possibility of traffic loss by first providing information required for switching a path to the EPC path to the UE that performs transmission. If all the UEs perform both transmission and reception, the order in which the information is transmitted thereto may be determined by an internal policy of the ProSe function unit. For example, the information may be first transmitted to a UE which has requested the path switching (or service continuity).

(2) The ProSe function unit transmits one or more pieces of following information to a UE that performs transmission, among UEs participating direct communication as a target of the path switching (or service continuity).

i) Information regarding the allocated IP address and port number ii) Other allocated resource information iii) Other information required for communication iv) Information indicating a counterpart UE performing direct communication that the pieces of information of i) to iii) will be transmitted This is to minimize a possibility of traffic loss by first providing the information required for path switching to the EPC path the UE performing transmission. If all the UEs perform both transmission and reception, a UE as a target to which the information is to be transmitted be determined by an internal policy of the ProSe function unit. For example, the information may be transmitted to a UE which has requested the path switching (or service continuity).

As described above, by first providing information required for path switching to the EPC path to the UE that performs transmission, the UE that performs transmission may allow to first switch a path than the UE that performs reception. When the path switching is performed in this manner, the UE that performs reception may be allowed to switch a path after completely receiving traffic transmitted from the UE that performs transmission before switching the path. Meanwhile, after switching the path, the UE that performs transmission transmits traffic to the ProSe MGW, and the ProSe MGW buffers the traffic until the UE that performs reception completes path switching, thereby preventing traffic loss.

In the above, it is described that the ProSe function unit transmits the aforementioned information when receiving the path switching request (or service continuity request) from the UE. However, alternatively, the ProSe function unit may perform (1) or (2) by determining switching of path (or service continuity) from the ProSe communication path to the EPC path by itself (here, in the case of (2), the ProSe function unit transmits the information to one of UEs that participate in direct communication). Alternatively, when the UE wants to perform ProSe communication or when it is discovered that the UE initiates ProSe communication, the ProSe function unit may perform (1) or (2) in order to provide the aforementioned information to the UE (Here, in the case of (2), the ProSe function unit transmits the information to one of UEs that participate in direct communication).

III. Operation of path switching (or service continuity) by ProSe function unit: Request for QoS/bearer resource required for communication through EPC path If necessary, the ProSe function unit may transmit a message for requesting a QoS/bearer required for transferring media traffic of a UE that performs transmission to the EPC path and/or a message for providing session-related information for switching to the EPC, to a PCRF. To this end, interfacing is required between the ProSe function unit and the PCRF.

Upon receiving the request, the PCRF may perform a bearer correction and/or dedicated bearer activation and/or PDN connection generation operation through communication with the P-GW.

IV. Operation of UE which has received/obtained information required for path switching (or service continuity) from ProSe function unit Upon obtaining the aforementioned information, the UE performs a path switching (or service continuity) operation on the basis of the information. The path switching (or service continuity) operation includes one or more pieces of following information.

a. The UE re-establishes the IP connection previously established with the UE (i.e., an IP address of the counterpart UE), on the basis of an IP address included in the received information. When a port number is included in the received information, the UE uses the port number.

b. The UE releases bearer/IP connection/PDN connection/TFT (Traffic Flow Template) used in direct communication c. The UE releases resource allocated to bearer/IP connection/PDN connection/TFT d. The UE releases bearer/IP connection/PDN connection/TFT-related context used in direct communication e. The UE deactivates bearer/IP connection/PDN connection/TFT used in direct communication f. The UE releases or deactivates the IP address used in direct communication g. The UE transmits information required for path switching (or service continuity) received from the ProSe function unit to the counterpart UE of direct communication.

Meanwhile, in a case in which the UE transmits a path switching request (or service continuity request) to a different network node, rather than to the ProSe function unit and the different network node transfers the path switching request to the ProSe function unit, the information required for the path switching (or service continuity) may be transferred to the UE from the ProSe function unit through the different network node.

V. Operation of UE which has received information required for path switching (or service continuity) from counterpart UE of direct communication The UE performs one or more operations among a to f mentioned above.

For example, when the UE#1 100-1 and the UE#2 100-2, which are transmitting and receiving traffic through the ProSe direct communication path, switch a path, communication is performed through the EPC path in the form of UE#1(100-1) <---> ProSe MGW <---> UE#2(100-2). For reference, an eNodeB, an S-GW, and a P-GW are included in a communication path between the UE#1 100-1, the ProSe MGW, and the UE#2 100-2.

Figure 12:
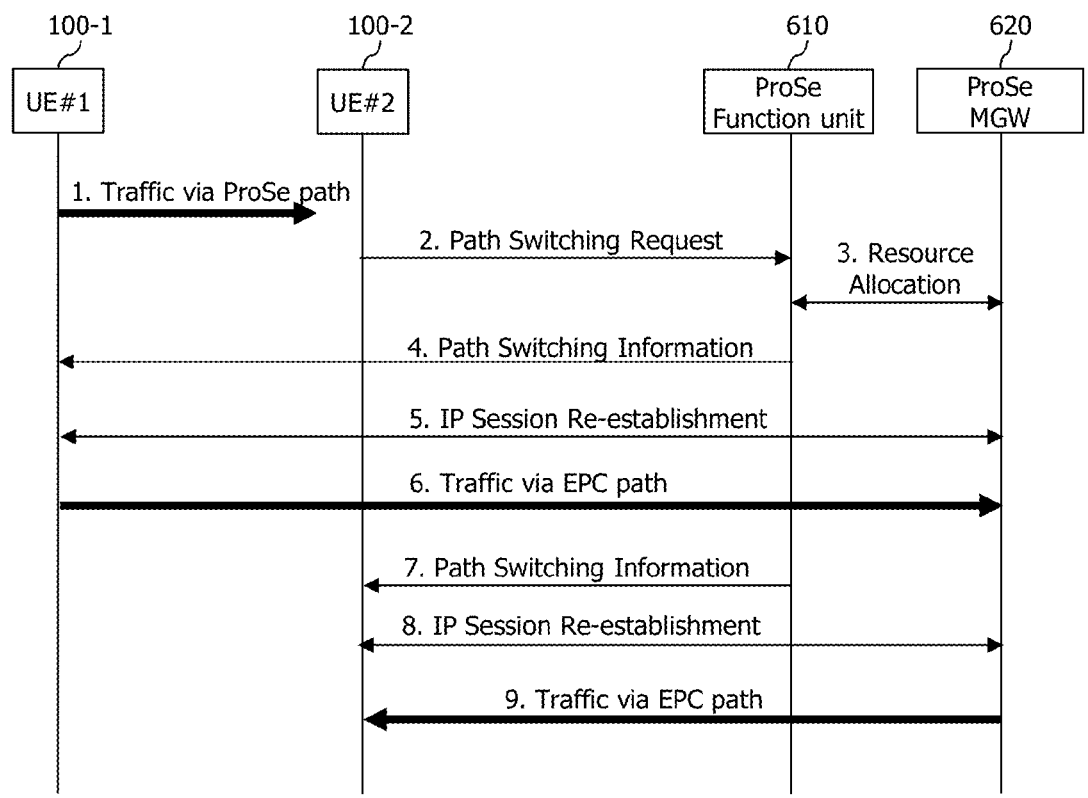
FIG. 12 is a signal flow chart illustrating a method according to an embodiment of the present disclosure.
Figure 13:
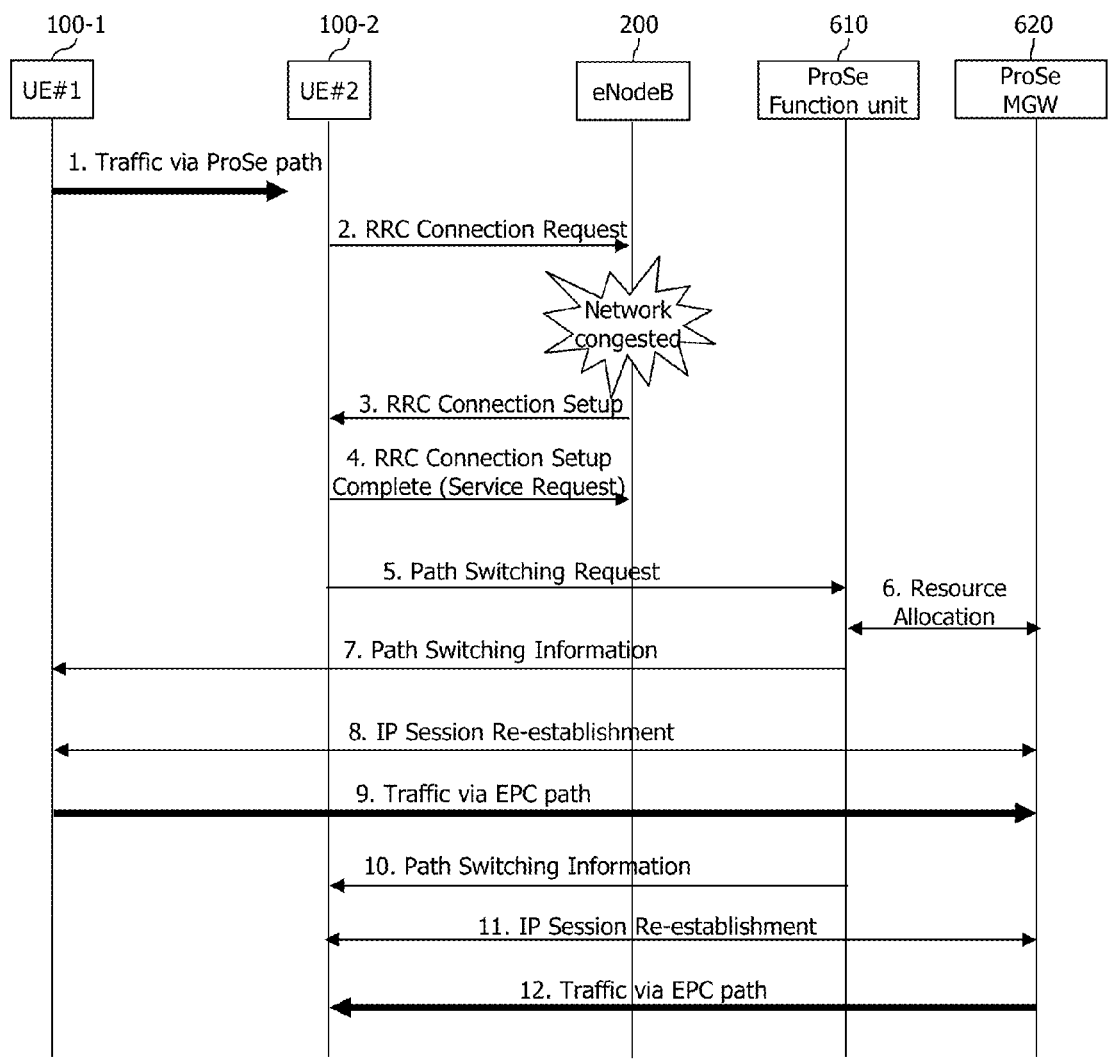
FIG. 13 is a flow chart specifically illustrating the method illustrated in FIG. 12.

FIGS. 12 and 13 illustrate the contents described above.

FIG. 12 is a signal flow chart illustrating a method according to an embodiment of the present disclosure.

1) The UE#1 100-1 and the UE#2 100-2 communicate with each other through the ProSe direct communication path. Here, the UE#1 100-1 is a transmission UE and the UE#2 100-2 is a reception UE.

2) The UE#2 100-2 determines that a path should be switched, that is, a path should be switched from a ProSe direct communication path to an EPC path, and transmits a path switching request (or service continuity request) message to a ProSe function unit 610. For details, please refer to Paragraph I.

3) Upon receiving the path switching request (or service continuity request) message, the ProSe function unit 610 performs an operation of allocating resource required for communication through the EPC path, with a ProSe MGW 620. For details, please refer to Paragraph II.

4) When the ProSe function unit 610 discovers that the UE#1 100-1 is a transmission UE on the basis of the received information, the ProSe function unit 610 first transmits information required for path switching (or service continuity) to the UE#1 100-1. For details, please refer to Paragraph II.

5) On the basis of the information required for path switching (or service continuity) received from the ProSe function unit 610, the UE#1 100-1 re-establishes an IP session for communication to the EPC path. For details, please refer to Paragraph IV.

6) Accordingly, the UE#1 100-1 starts to transmit traffic to be transmitted to the UE#2 100-2, through the EPC path.

7) The ProSe function unit 610 transmits the information required for path switching (or service continuity) to the UE#2 100-2. For details, please refer to Paragraph II.

8) When the information required for path switching (or service continuity) is received from the ProSe function unit 610, the UE#2 100-2 re-establishes an IP session on the basis of the received information. For details, please refer to Paragraph IV.

9) The traffic transmitted by the UE#1 100-1 is transferred to the UE#2 100-2.

Step 7) may be performed after step 4).

FIG. 13 is a flow chart specifically illustrating the method illustrated in FIG. 12.

1) Both the UE#1 100-1 and the UE#2 100-2 directly communicate with each other through the ProSe path in an RRC idle state. Here, the UE#1 100-1 is a transmission UE and the UE#2 100-2 is a reception UE.

2) The UE#2 100-2 determines that a path should be switched, that is, a path should be switched from the ProSe direct communication path to the EPC path. Here, the UE#2 100-2 is in an RRC idle state, and thus, in order to transmit a path switching request (or service continuity request) message to the ProSe function unit, the UE#2 100-2 is required to be switched to an RRC connected state, and thus, the UE#2 100-2 performs a service request procedure. That is, the UE#2 100-2 transmits an RRC connection request message to the eNodeB 200. Here, the UE#2 100-2 sets an establishment cause value within the RRC connection request message to proseServiceCont, for example, as described above in Phrase I.

3) The eNodeB 200 is in a congested state in which it cannot permit every RRC connection request message. However, since the establishment cause value included in the RRC connection request message received from the UE#2 100-2 is proseServiceCont, the eNodeB 200 determines to permit the RRC connection request message and transmits an RRC connection setup message to the UE#2 100-2.

4) The UE#2 100-2 transmits an RRC setup complete message including a service request message of an NAS layer to the eNodeB 200. Accordingly, the UE#2 100-2 enters an RRC connected state. Meanwhile, the MME and the S-GW/P-GW participate in the service request procedure but are omitted in the drawing for the simplicity of descriptions.

5) The UE#2 100-2 transmits a path switching request (or service continuity request) message to the ProSe function unit 610. For details, please refer to Paragraph I.

6) Upon receiving the request message, the ProSe function unit 610 performs an operation of allocating resource required for communication through the EPC path, with the ProSe MGW 620. For details, please refer to Paragraph II.

7) When the ProSe function unit 610 discovers that the UE#1 100-1 is a transmission UE on the basis of the received information, the ProSe function unit 610 first transmits information required for path switching (or service continuity) to the UE#1 100-1. For details, please refer to Paragraph II.

Meanwhile, in a case in which the UE#1 100-1 is still in the RRC idle state even to this time, in order for the message transmitted by the ProSe function unit 610 to be transferred to the UE#1 100-1, a paging signal should be first transmitted to the UE#1 100-1. Such a paging procedure is omitted in this drawing and details thereof will be referred to Paragraph 5.3.4.3 Network Triggered Service Request of 3GPP TS 23.401. In general, in a case in which an RRC connection request message is transmitted in response to the paging signal, mt-Access may be set as an establishment cause value within the RRC connection request message. However, in an embodiment of the present disclosure, since the UE#1 100-1 receives the paging signal, while performing direct communication, the UE#1 100-1 may set proseServiceCont as an establishment cause value within the RRC connection request message.

8) When the information required for path switching (or service continuity) is received from the ProSe function unit 610, the UE#1 100-1 re-establishes an IP session on the basis of the received information for communication through the EPC path. For details, please refer to forgoing Paragraph IV.

9) The UE#1 now transmits traffic to be transmitted to the UE#2 100-2, through the EPC path.

10) The ProSe function unit 610 transmits information required for path switching (or service continuity) to the UE#2 100-2. For details, please refer to Paragraph II.

11) When the information required for path switching (or service continuity) is received from the ProSe function unit 610, the UE#2 100-2 re-establishes an IP session on the basis of the received information. For details, please refer to Paragraph IV.

12) The traffic transmitted by the UE#1 100-1 is transmitted to the UE#2 100-2.

The step 10) may be performed after step 7).

All the processes illustrated in the drawings described so far may not necessarily be performed, and only some of the steps may be performed according to circumstances.

Meanwhile, the ProSe function unit (or ProSe server) designated so far may also be referred to as a ProSe SC function unit (or ProSe SC server( ) for ProSe service continuity (SC). In this case, the ProSe SC function unit may be provided separately from the existing ProSe function unit. However, even in this case, the UE may exchange a message with the ProSe function unit and the ProSe function unit may transmit the message to the ProSe SC function unit. In this case, the ProSe MGW is operated by the ProSe SC function unit. This may be generally applied in the present disclosure.

The direct communication may also be interpreted as a session, IP connection(s), PDN connection, bearer(s), IP flow(s), and the like, related to direct communication.

The present invention may also be applied to a general UMTS/EPS mobile communication system including both a 3GPP connection network (e.g., UTRAN/GERAN/E-UTRAN) and a non-3GPP connection network (e.g., a WLAN, or the like). In addition, the present invention may be applied to every wireless mobile communication system environment in an environment in which network control is applied.

The contents described so far may be implemented by hardware. Details thereof will be described with reference to FIG. 14.

Figure 14:
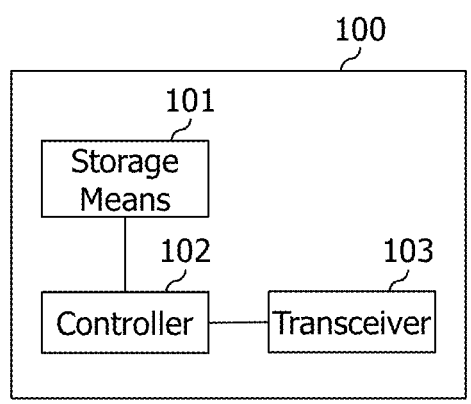
FIG. 14 is a block diagram illustrating a configuration of a UE according to an embodiment of the present disclosure.

FIG. 14 is a block diagram illustrating a configuration of a UE 100 according to an embodiment of the present disclosure.

As illustrated in FIG. 14, the UE 100 includes a storage unit 101, a controller 102, and a transceiver unit 103.

The storage unit 101 stores the aforementioned methods.

The controller 102 controls the storage unit 101 and the transceiver unit 103. In detail, the controller 102 executes the methods stored in the storage unit 101. Also, the controller 102 transmits the aforementioned signals through the transceiver unit 103.

Embodiments of the present invention have been described, but the scope of the present invention is not limited to the specific embodiments set forth herein and may be variously modified and improved within the scope of the appended claims of the present invention.

What is claimed is:

1. A method for performing a proximity service (ProSe) based on near-field communication (NFC) by a user equipment (UE), the method comprising:
   determining, by a ProSe layer of the UE, whether to continue the proximity service through switching of a communication path;
   transmitting, to a base station (BS), a radio resource control (RRC) connection request message including an establishment cause,
   wherein the establishment cause indicates that a service continuity is required after switching from a direct communication path to an indirect communication path,
   wherein the establishment cause blocks the base station from rejecting the RRC connection request message; and
   transmitting a path switching request message to a server responsible for the proximity service when an RRC connection has been established.

2. The method of claim 1, wherein the RRC connection request message, including the establishment cause, is processed with a higher priority by the BS compared to an RRC connection request message that does not include an establishment cause.

3. The method of claim 1, wherein information regarding a communication state with another UE transferred by an AS layer to an upper layer through a NAS layer includes one or more of information regarding signal strength for a signal received through a direct communication path from the other UE and information indicating unavailability of the direct communication path with the other UE.

4. The method of claim 1, further comprising:
   receiving a response message regarding the path switching request message from the server responsible for the proximity service, wherein the response message includes information required for path switching.

5. The method of claim 1, further comprising:
   switching a direct communication path with another UE to an evolved packet core (EPC) path; and
   when the switching to the EPC path is completed, receiving traffic from the other UE, through a proximity service media gateway within an EPC.

6. A user equipment (UE) performing a proximity service (ProSe) based on near-field communication (NFC), the UE comprising:
   a transceiver; and
   a processor that controls the transceiver to:
   transmit, to a base station (BS), a radio resource control (RRC) connection request message including an establishment cause,
   wherein the establishment cause indicates that a service continuity is required after switching from a direct communication path to an indirect communication path,
   wherein the establishment cause further indicates that the service continuity is required by the base station to avoid rejecting the RRC connection request message;
   transmit a path switching request message to a server responsible for the proximity service, when an RRC connection is established,
   wherein a ProSe layer of the UE determines whether to continue the proximity service through switching of a communication path.

7. The UE of claim 6, wherein the RRC connection request message, including the establishment cause, is processed with a higher priority by the BS compared to an RRC connection request message that does not include an establishment cause.

8. The UE of claim 6, wherein information regarding a communication state with another UE transferred by an AS layer to an upper layer through a NAS layer includes one or more of information regarding signal strength for a signal received through a direct communication path from the other UE and information indicating unavailability of the direct communication path with the other UE.

9. The UE of claim 6, wherein the processor further controls the transceiver to receive a response message regarding the path switching request message from the server responsible for the proximity service, and wherein the response message includes information required for path switching.

10. The UE of claim 6, wherein the processor further controls the transceiver to receive traffic from another UE through a proximity service media gateway within an EPC, when switching a direct communication path with the other UE to an evolved packet core (EPC) path is completed.

* * * * *